No. 881,768. PATENTED MAR. 10, 1908.
H. M. BRADLEY.
TIRE PROTECTOR.
APPLICATION FILED FEB. 20, 1907.

WITNESSES
Edward Thorpe

INVENTOR
Herbert M. Bradley
BY Munn & Co
ATTORNEYS

UNITED STATES PATENT OFFICE.

HERBERT M. BRADLEY, OF FORT WORTH, TEXAS.

TIRE-PROTECTOR.

No. 881,768.

Specification of Letters Patent.

Patented March 10, 1908.

Application filed February 20, 1907. Serial No. 358,365.

*To all whom it may concern:*

Be it known that I, HERBERT M. BRADLEY, a citizen of the United States, and a resident of Fort Worth, in the county of Tarrant and State of Texas, have invented a new and Improved Tire-Protector, of which the following is a full, clear, and exact description.

The invention relates to vehicle wheels having pneumatic or solid rubber tires, and the object of the invention is to provide a new and improved tire protector, arranged to prevent the tire from being punctured, at the same time preventing skidding of the wheel on a slippery roadway.
The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
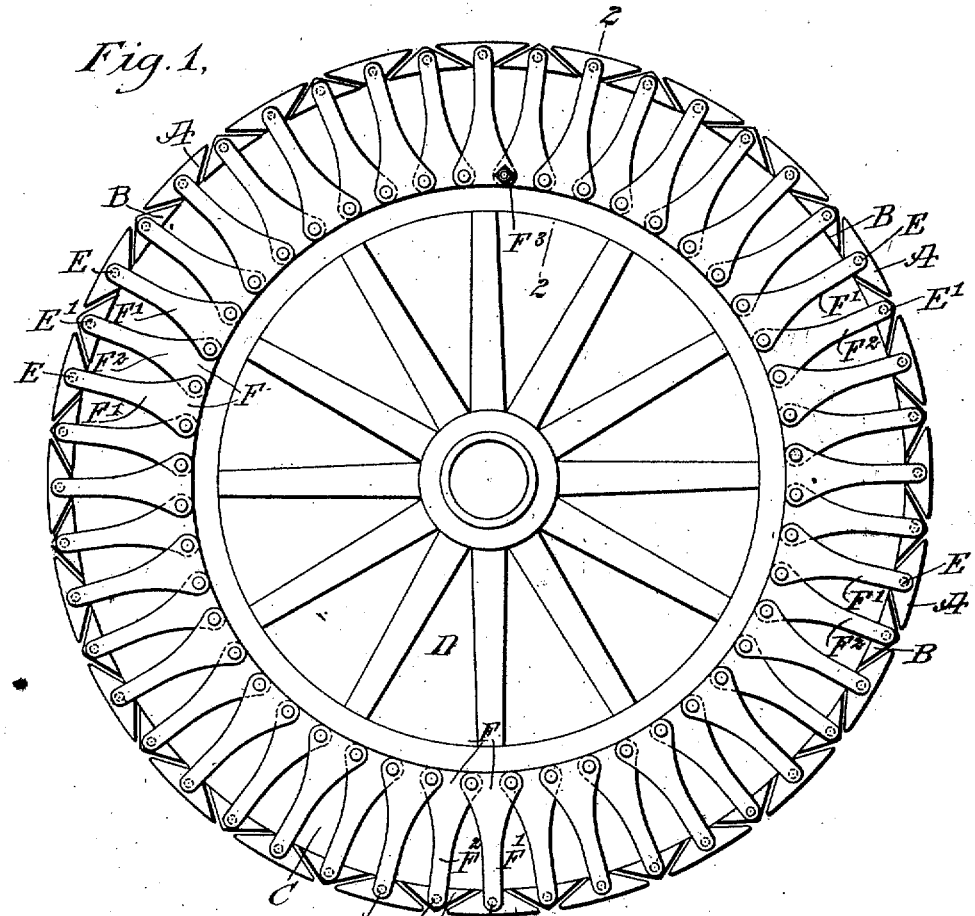
Figure 2:
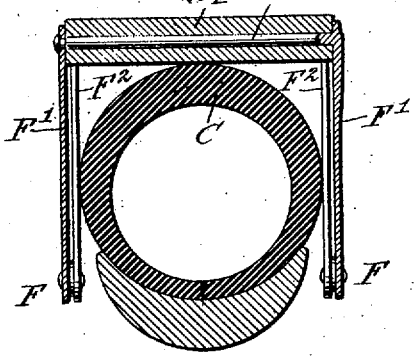
Figure 3:
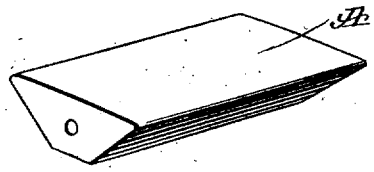
Figure 4:
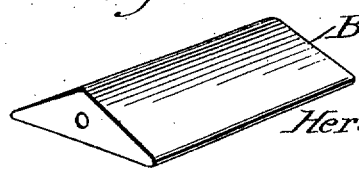

Figure 1 is a side elevation of the improvement as applied; Fig. 2 is an enlarged transverse section of the same on the line 2—2 of Fig. 1, and Figs. 3 and 4 are perspective views of alternating tread sections.

The alternating tread sections A and B extend across the peripheral face of the rubber tire C of the wheel D, and the said tread sections A and B are held on transverse pivots E and E', carried by the sets of arms F', F² of two link chains F—F, disposed on opposite sides of the wheel, as plainly indicated in Figs. 1 and 2.

The tread sections A and B may be of wood, metal or other suitable material, and their oppositely disposed ends are beveled in opposite directions and slightly spaced apart, as plainly indicated in Fig. 1, so as to allow a slight turning motion of each individual tread section, at the same time forming a practically uninterrupted tread for the wheel D. As the tread sections A and B are in contact with the outer peripheral face of the tire C, it is evident that the protector readily yields with the tire C when a load is applied, so that the desired usual cushioning effect is maintained, at the same time the tire C is protected against being punctured. It will also be noticed that by the arrangement described skidding of the wheel on a slippery roadway is reduced to a minimum, as the alternate flat and pointed outer faces of the tread sections A and B tend to firmly grip the surface of the roadway.

The tire protector shown and described is very simple and durable in construction and can be readily applied or removed from the wheel whenever it is desired to do so by simply opening a bolt pivot F³ on each link chain F, as indicated near the top of Fig. 1.

The tread sections A have their outer faces curved according to the circumference of the wheel, while the outer faces of the intermediate tread sections are somewhat pointed, thus practically forming a continuous tread circumference and allowing sufficient space for the tread sections to work when the tire C is compressed at the bottom on applying the load.

Having thus described my invention, I claim as new and desire to secure by Letters Patent:

1. A tire protector comprising a sectional tread covering the outer face of the tire, the tread being formed of tread sections having their forward and rear ends beveled outwardly, and alternating sections having their corresponding ends beveled inwardly and facing the beveled ends of the first mentioned tread sections, and means for supporting the said treads in position on the tire.

2. A tire protector comprising a sectional tread around the tire and consisting of tread sections extending across the peripheral face of the tire and each having its front and rear ends beveled outwardly, and tread sections alternating with the first mentioned sections and having their corresponding ends beveled inwardly and facing the beveled ends of said first mentioned sections, the adjacent beveled ends of the treads being normally slightly spaced apart, and link chains on opposite sides of the tire and having outwardly extending arms in which the tread sections are pivoted.

3. A tire protector comprising a sectional tread around the tire and formed of tread sections having their outer faces curved and having their ends beveled outwardly, the said sections being spaced apart, and tread sections alternating with the first sections and having their ends beveled inwardly from the center of the outer face, the angles formed at the junction of the beveled surfaces of said sections being at the spaces between the first mentioned sections, and link chains on opposite sides of the tire, and having outwardly extending arms supporting the said tread sections.

In testimony whereof I have signed my name to this specification in the presence of two subscribing witnesses.

HERBERT M. BRADLEY.

Witnesses:
J. A. EVANS,
C. C. HUYEN.